(12) United States Patent
Moeller

(10) Patent No.: US 11,261,915 B2
(45) Date of Patent: Mar. 1, 2022

(54) METHOD OF FINISHING A BEARING RING

(71) Applicant: Siemens Gamesa Renewable Energy A/S, Brande (DK)

(72) Inventor: Troels Kildemoes Moeller, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 82 days.

(21) Appl. No.: 16/493,891

(22) PCT Filed: Jan. 2, 2018

(86) PCT No.: PCT/EP2018/050042
§ 371 (c)(1),
(2) Date: Sep. 13, 2019

(87) PCT Pub. No.: WO2018/166661
PCT Pub. Date: Sep. 20, 2018

(65) Prior Publication Data
US 2020/0088238 A1    Mar. 19, 2020

(30) Foreign Application Priority Data

Mar. 15, 2017  (DE) .................... 10 2017 204 340.7

(51) Int. Cl.
*F16C 33/64*    (2006.01)
*F16C 19/38*    (2006.01)
(Continued)

(52) U.S. Cl.
CPC ............ *F16C 33/64* (2013.01); *F16C 19/386* (2013.01); *F03D 80/70* (2016.05); *F05B 2240/50* (2013.01);
(Continued)

(58) Field of Classification Search
CPC ...... F16C 33/64; F16C 33/585; F16C 19/386; F16C 19/364; F16C 2300/14;
(Continued)

(56) References Cited

U.S. PATENT DOCUMENTS

2003/0021504 A1    1/2003  Tibbits
2005/0102837 A1    5/2005  Kaminski et al.
(Continued)

FOREIGN PATENT DOCUMENTS

CN    1607056 A     4/2005
CN    101360927 A   2/2009
(Continued)

OTHER PUBLICATIONS

Office Action in corresponding Chinese Patent Application No. 201880032586.6 dated Nov. 18, 2020. 4 pages.
(Continued)

*Primary Examiner* — Moshe Wilensky
(74) *Attorney, Agent, or Firm* — Schmeiser, Olsen & Watts LLP

(57) ABSTRACT

Provided is a method of machining a bearing ring of a wind turbine bearing, the method including the steps of identifying a number of local hard zones on a surface of the bearing ring and removing material from the surface such that a bearing ring thickness in local hard zone is less than a bearing ring thickness outside a local hard zone. A machining assembly, a wind turbine bearing and a wind turbine is also provided.

17 Claims, 8 Drawing Sheets

(51) Int. Cl.
   *F03D 80/70*    (2016.01)
   *F16C 19/36*    (2006.01)
   *F16C 33/58*    (2006.01)

(52) U.S. Cl.
   CPC .......... *F16C 19/364* (2013.01); *F16C 33/585* (2013.01); *F16C 2300/14* (2013.01); *F16C 2360/31* (2013.01)

(58) Field of Classification Search
   CPC .. F16C 2360/31; F16C 2220/70; F03D 80/70; F05B 2240/50
   See application file for complete search history.

(56) References Cited

U.S. PATENT DOCUMENTS

| | | |
|---|---|---|
| 2012/0269476 A1 | 10/2012 | Akimoto et al. |
| 2020/0088238 A1 | 3/2020 | Moeller |

FOREIGN PATENT DOCUMENTS

| | | |
|---|---|---|
| CN | 110621895 A | 12/2019 |
| DE | 4327306 A1 | 2/1994 |
| EP | 1517058 A1 | 3/2005 |
| EP | 1977126 A1 | 10/2008 |
| EP | 1977126 B1 | 10/2009 |
| EP | 2373899 A2 | 10/2011 |
| EP | 2373899 B2 | 10/2011 |
| EP | 3009668 A1 | 4/2016 |
| GB | 2514845 A | 12/2014 |
| JP | H03181618 A | 8/1991 |
| JP | 2005090680 A | 4/2005 |
| JP | 2005325854 A | 11/2005 |
| WO | 2013088201 A1 | 6/2013 |

OTHER PUBLICATIONS

International Search Report for application No. PCT/EP2018/050042 dated Apr. 5, 2018.
Office Action in corresponding Chinese Patent Application No. 201880032586.6, dated May 22, 2020. 9 pages.

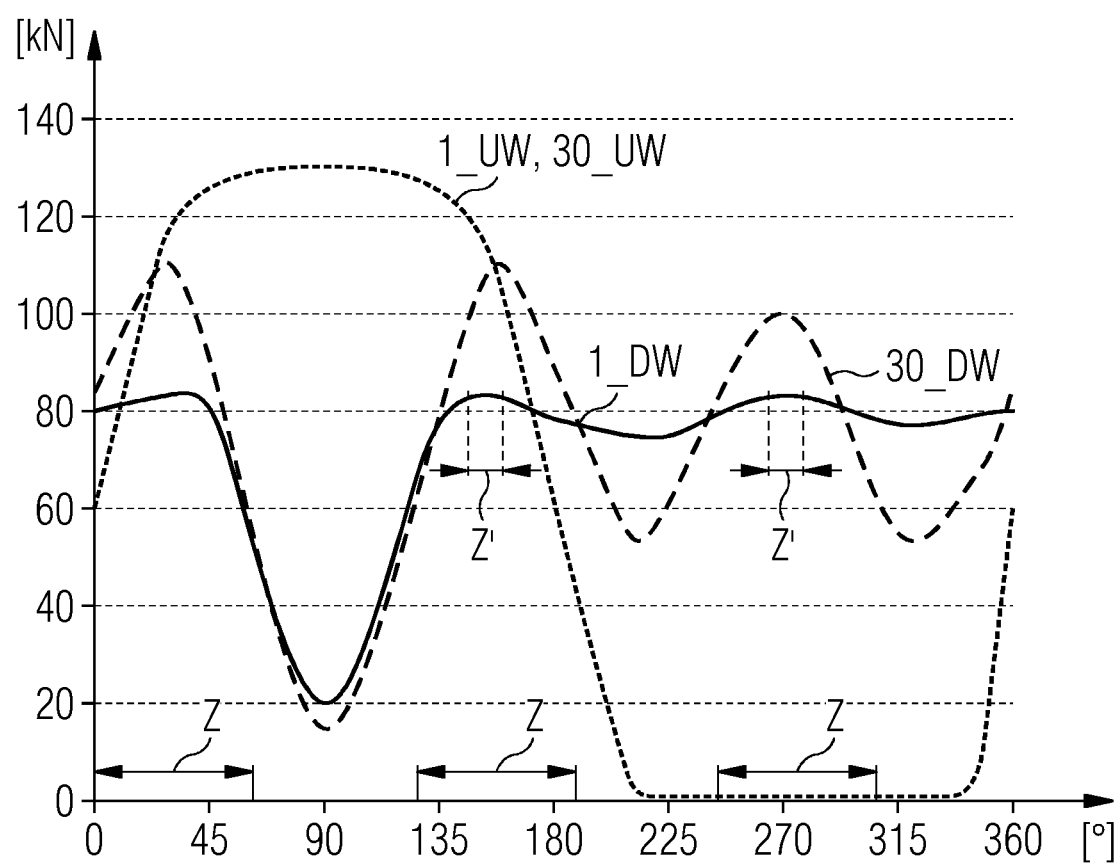

METHOD OF FINISHING A BEARING RING

CROSS-REFERENCE TO RELATED APPLICATIONS

This application claims priority to PCT Application No. PCT/EP2018/050042, having a filing date of Jan. 2, 2018, based off of German Application No. 10 2017 204 340.7 having a filing date of Mar. 15, 2017, the entire contents both of which are hereby incorporated by reference.

FIELD OF TECHNOLOGY

The following describes a method of finishing a bearing ring of a wind turbine bearing; a bearing ring finishing assembly; a wind turbine bearing; and a wind turbine.

BACKGROUND

In the case of a wind turbine generator, the overall stiffness of the combined hub, main bearing, main shaft and generator rotor must be great enough to maintain a satisfactory airgap in the generator even under extreme loading conditions. The wind turbine rotor (the combination of hub and rotor blades) will tend to deflect in various directions during operation of the wind turbine, and the main bearing—which can have a diameter in the order of several meters in the case of a multi-megawatt direct-drive wind turbine—must be sufficiently stiff to be able to withstand these deflections so that the airgap usually in the order of only a few millimetres—remains essentially constant under all operating conditions.

The design of a bearing will be based on information about the surrounding structure, in particular the stiffness of the surrounding structure, and the loading that is to be expected during operation. A bearing such as a wind turbine main bearing must be manufactured to a very high degree of precision in the raceway system (comprising the raceways and the roller elements) in order to keep any angular misalignment between inner ring and outer ring within an acceptable level; to achieve satisfactory load sharing between the rolling elements of the bearing; and to achieve acceptable surface pressure distribution during operation. An estimation of the expected lifetime of a bearing is generally based on detailed information regarding load sharing and surface pressure distribution inside the bearing.

The desired degree of precision for a bearing is achieved during a final machining process, typically by grinding, and is applied over an entire raceway surface (i.e. over 360°) to ensure that the raceway surface is as uniform as possible in the complete circumference with respect to e.g. profile, raceway pitch circle diameter, raceway contact angle etc. It is usual that the raceway is machined to a very high degree of precision, with a tolerance in the order of only a few microns, often as few as 10 µm. While the main bearing of a wind turbine can be manufactured to a very high level of quality, the known machining techniques cannot avoid fatigue damage completely, and this ultimately sets an upper limit on the expected or calculated lifetime of the bearing.

SUMMARY

An aspect relates to provide an improved way of finishing a bearing to overcome the problems mentioned above.

According to the embodiments of the invention, the method of finishing a bearing ring of a wind turbine bearing comprises the steps of identifying a number of local hard zones on a surface of the bearing ring; and removing material from the surface of the bearing such that a bearing ring thickness in a local hard zone is less than a bearing ring thickness outside a local hard zone.

A bearing ring can be finished by using any suitable machining process such as grinding or turning. Generally, grinding is the process of choice. In the following therefore, without restricting the embodiments of the invention in any way, it may be assumed that a final finishing step involves grinding a surface of the bearing ring to achieve a desired profile. The terms "machining" and "grinding" may be regarded as synonyms unless otherwise indicated. The surface that is being machined in this finishing step may be referred to simply as the "machining surface" or "grinding surface".

The known or established grinding processes have focused on manufacturing unassembled and unloaded bearing rings and raceways with as uniform a surface profile as possibly over the complete circumference of the bearing. The bearing of a wind turbine, when machined to achieve such uniform raceway profiles, may suffer from accelerated fatigue damage on account of so-called "local hard zones" inside the bearing. A local hard zone is a region of a raceway in which significantly higher roller loading occurs compared to the adjacent areas in that same raceway. Roller loading is generally in the order of several tens of kilonewtons (kN) for a large bearing. The surface pressure on a bearing raceway is also higher in a local hard zone than in adjacent areas in that same raceway. Surface pressure is generally in the order of 900-1800 megapascal (MPa). In a wind turbine main bearing that is subject to a conventional uniform grinding step in a finishing stage, relatively large local hard zones over several tens of degrees—arise from the fluctuating character of the loading on the wind turbine rotor (the combination of hub and rotor blades). The existence of local hard zones in a bearing will have a negative influence on the bearing lifetime, and may be understood to be one of the limiting factors in bearing lifetime.

The position of a local hard zone on a surface of the bearing, as well as its shape or contour, can be determined by advanced finite element analysis (FEM) calculations for that specific bearing type and its expected loading. A subsequent step in the inventive method, after identifying a number of local hard zones, is a step of non-uniform grinding (or turning, as appropriate) according to a specific machining profile over the complete circumference of the bearing surface, i.e. over 360°. The resulting non-uniform profile on the machined surface of the bearing will be characterized by transitions from a nominal height to a lower height in each of the local hard zones identified for that bearing type. Since material is removed from the regions identified as the local hard zones, any bearing that is machined using the inventive method will be essentially free of such local hard zones during operation of the wind turbine. The inventive method can therefore extend the lifetime of such a bearing by 10%-30% compared to a bearing that is not finished using the inventive method (i.e. a bearing with a uniform profile over each of its raceways).

A wind turbine bearing manufactured using the conventional finishing techniques is typically expected to have a lifetime of twenty years or so. The inventive method takes into account the complete loading of the bearing, including the negative influence from local hard zones. As a result, the rollers and raceways are not subject to excessive loading in such "local hard zones", thereby leading to a longer bearing lifetime. The inventive method can effectively reduce the area of a local hard zone to a very significant extent. Instead of extending over an arc spanning several tens of degrees on a bearing raceway, any remaining local hard zones may be completely eliminated, or reduced to within an arc of only a few degrees. The effect of this is to extend the lifetime of the bearing. It is a very significant advantage to be able to extend the lifetime of such a bearing by several years.

According to the embodiments of the invention, the machining assembly comprises a support realized to hold a bearing ring of a wind turbine during a machining procedure; a machining tool such as a grinding wheel arranged to remove material from a machining surface of the bearing ring; and a control unit realized to control at least the machining tool. There are essentially two main ways of achieving the desired machining pattern. In one embodiment, the control unit of the inventive machining assembly is realized to receive information determining the location of one or more local hard zones on the surface to be machined, and the control unit is realized to control the position of the machining tool to reduce the bearing ring thickness in a local hard zone to a greater extent than in a region between local hard zones. In an alternative embodiment, the machining assembly comprises a number of distortion means arranged to force the local hard zones closer to the machining tool. Because of the distorted shape of the bearing ring, the bearing ring thickness is reduced to a greater extent over the local hard zones than in any area between these local hard zones. In this alternative embodiment, there is no need to adjust the machining tool position relative to the local hard zones.

According to the embodiments of the invention, the wind turbine bearing comprises an inner bearing ring and an outer bearing ring, and at least one surface of a bearing ring is ground using the inventive method. According to the embodiments of the invention, the wind turbine comprises a plurality of rotor blades mounted to a hub, a generator with an outer rotor and an inner stator, and a bearing comprising a stationary inner bearing ring and a rotatable outer bearing ring, which outer bearing ring connects the hub to the generator rotor, wherein at least one of the bearing rings is machined in a finishing step using the inventive method. The inventive bearing ring is advantageously able to better withstand the loading arising from combined gravity and wind loads on the rotor, and has a favourably long lifetime as a result. Any wind turbine that incorporates such a bearing can favourably benefit from the extended lifetime of the bearing.

Particularly advantageous embodiments and features of the embodiments of the invention are given by the dependent claims, as revealed in the following description. Features of different claim categories may be combined as appropriate to give further embodiments not described herein.

The inventive method can be applied to any type of bearing that might benefit from a non-uniform grinding of a surface such as a raceway. For example, the inventive method can be applied to a blade pitch bearing of the roller bearing type. These bearings may also exhibit local hard zones, and may benefit from the inventive method to eliminate or at least significantly reduce the hard zones. However, without restricting the embodiments of the invention in any way, it may be assumed that the bearing is the main bearing of a wind turbine.

An example of a local hard zone on a grinding surface can be a zone or region that corresponds to the future position of a rotor blade relative to the bearing ring when the bearing is installed in a wind turbine. Such a local hard zone or "blade region" can be regarded as the "shadow" that would be cast by a blade mounted to the hub which in turn is mounted to the bearing. These blade regions are geometrically "fixed" in the case of the rotating bearing ring, since this rotates as one unit with the rotor. A blade region can be essentially symmetrical about the "shadow" that would be cast by a blade mounted to the hub. Equally, such a local hard zone may be shifted to one side of the blade axis "shadow". Any such blade-related hard zone will generally be found on the downwind side of a bearing ring. The loading experienced by an upwind side of a bearing ring is generally of a different nature, and arises from the bending moment through the centre of mass of the wind turbine rotor. The upwind side of a bearing ring may therefore only show a single local hard zone in an upper region of the bearing ring.

Since most wind turbines have three rotor blades, in the following it may be assumed that up to three blade regions are identified for the bearing surface that is to be ground. These three blade regions will be equidistantly arranged about the bearing surface, in the same way that the rotor blades are equidistantly arranged about the axis of rotation of the hub. With three blade regions, there will automatically be three intermediate or non-blade regions.

A bearing for use in a system such as a generator generally has one stationary ring that is mounted to a supporting structure that carries the stationary part of the generator, and one rotatable ring that is mounted to the rotating part of the generator. In a structure such as a wind turbine, there are various ways in which a generator may be realized. The generator might have an outer rotor or field carrying the magnets, and an inner stator or armature carrying the windings, for example. In an alternative embodiment, the generator might have an outer stator and an inner rotor; the rotor may be realized as the armature and the stator might be realised as the field, etc. While any such embodiment is possible, in the following it may be assumed that the generator has a rotating outer field (carrying the magnets) that is connected to the hub by means of a rotatable outer bearing ring, and that the stationary inner bearing ring is mounted to a main shaft. It may be assumed, for the purposes of discussion, that the wind turbine is a large direct-drive wind turbine with such a generator.

The bearing under discussion may be assumed to be a rolling element bearing. Various types of rolling element are also possible, for example a tapered bearing, cylindrical roller bearing, spherical roller bearing etc. The bearing may have one or more rows of rolling elements, whereby the rolling elements of a row are generally guided by means of raceway shoulders and a roller cage. In the following, without restricting the embodiments of the invention in any way, it may be assumed that the bearing is a two-row tapered roller bearing so that each bearing ring inner ring and outer ring has two raceways or seats. A raceway closest to the hub is referred to as an upwind raceway, and a raceway furthest from the hub is referred to as a downwind raceway. For a bearing such as a wind turbine main bearing, the raceways are angled in a "V" formation, as will become clear from the diagrams.

In a preferred embodiment of the invention, the grinding surface is preferably a raceway of the bearing ring, i.e. material is preferably ground from one of the raceways—for example from a raceway on the downwind side of the outer ring.

The inventive method may be performed as part of a final grinding procedure. The bearing ring to be machined or ground will already have been finished to a high level of precision, and only a very small amount of material—e.g. only 100 µm or less—will be removed in the final machining stage. To this end, a grinding pattern is previously determined for the entire bearing ring, whereby the grinding depth for each local hard zone and each intermediate region (a region between local hard zones) is determined in advance. A grinding depth is to be understood as the depth to which material is to be removed from a local hard zone. For the exemplary situation described above for a main bearing for use in a wind turbine with three rotor blades, the desired grinding pattern may comprise an alternating pattern of x and y, where x>y, and whereby x is the grinding depth within each of three blade regions, and y is the grinding depth in each of the intermediate regions. Preferably, there is a smooth transition between the shallow grinding depth (y) and the deeper grinding depth (x) which is described as the so-called grinding depth profile. The optimal grinding depth profile can be calculated by a suitable analysis tool such as advanced FEM analysis.

Parameters and dimensions of the bearing ring will depend to a large extent on the type of machine into which it will be incorporated. For example, the thickness of a wind turbine bearing ring is preferably determined on the basis of loading values that have been estimated or calculated for that type of wind turbine. In conventional wind turbine bearings, the raceways are machined to achieve a profile that is as uniform as possible, i.e. each bearing ring has a constant profile over its entire circumference. This is to be understood to mean that the raceway of a conventional bearing—whether flat or crowned—has a uniform pitch circle diameter and angle over the entire circumference of the raceway. In other words, a radial cross-section through the raceway of a conventional bearing will be the same for all points along the raceway.

In a preferred embodiment of the invention, the grinding depth for a surface is calculated on the basis of a specific predicted loading pattern that will arise from the rotor—i.e. the hub and blades of that type of wind turbine. The specific predicted loading pattern established in the course of the embodiments of the invention takes a "fatigue characteristic load case" into consideration in order to achieve a best possible improvement in lifetime for a specific bearing type. The fatigue characteristic load case is related to a wind speed interval (e.g. a wind speed of 9-11 m/s for a wind turbine that will use that bearing type), and the relevant bearing parameters are generally optimised on the "worst case" assumption that the wind turbine will operate continually in this wind speed interval, at which the power output of the wind turbine is adjusted to its nominal value. It is beneficial to optimize a bearing for the situation to which it will most likely be exposed over much of its lifetime, and usually any such optimization is based on such a "worst case" wear and tear scenario. In addition to considering such a fatigue characteristic load case, the inventive method also effectively eliminates or minimizes any local hard zones in a wind turbine main bearing.

A representative rotor position for obtaining the specific predicted loading pattern in the bearing is a position with one blade pointing vertically downwards, and the other two blades pointing upward and outward. This position is known as the "bunny" position since it is similar to the nose section of a rabbit. In the case of a three-blade rotor, this position is reached three times during each full revolution of the rotor. The loading associated with this position arises from a combination of several loading effects: firstly, the combined mass of the rotor (hub and blades) acts on its centre of gravity (which is at a distance outward from the bearing) resulting in a tilting force on the bearing; secondly, the hub undergoes elastic deformation owing to the flapwise and edgewise bending moments of each of the rotor blades, and this hub deformation is transferred to the bearing. The inventive method takes this fatigue characteristic load case into consideration by the grinding pattern, which comprise three slightly deeper blade regions alternating with three intermediate regions, in a pattern corresponding to the "Y" of the three rotor blades. This grinding pattern favourably allows the bearing to operate, to a large extent, without local hard zones during a high number of operational hours resulting in lower bearing lifetime consumption. The deeper grinding depth (x) within a blade region preferably exceeds the shallower grinding depth (y) by a few microns, for example by 30-100 µm in the case of a main bearing with a diameter of 2-4 m.

The grinding surface can be any surface of a bearing ring that is subject to uneven loading as the rotor rotates. This uneven loading may apply to a flange of the bearing, for example, and the flange surface can be ground using the inventive method after identifying the blade regions on that flange surface. However, it is the raceways of a bearing that are the surfaces most affected by the uneven loading, and in the following, without restricting the embodiments of the invention in any way, it may be assumed that a grinding surface is the raceway of a bearing ring. For example, in the inventive method, material is preferably removed from the raceway in a blade region to achieve an essentially constant bearing ring thickness over the blade region. Preferably, the grinding wheel is controlled to achieve a smooth transition between a local hard zone and a neighbouring region. For example, if a local hard zone extends over 60° of the bearing ring, and the grinding depth in a local hard zone is 80 µm deeper than in an intermediate region, a transition zone can extend over 60°, overlapping the local hard zone and intermediate region, and the grinding depth may gradually increase from the intermediate region into the local hard zone.

Alternatively or in addition, in a preferred embodiment of the invention material may be removed from the raceway in a blade region to achieve an angular correction. To achieve a desired angular correction, the bearing ring thickness may transition gradually from a first thickness at an outer circumference of the grinding surface to a second thickness at an inner circumference of the grinding surface.

The inventive machining assembly may be assumed in the following to be a grinding assembly. The desired grinding pattern can be achieved by appropriate control of the grinding wheel of the grinding assembly. Preferably, the grinding assembly comprise a multi-axis grinding wheel, i.e. a grinding wheel which can at least be controlled to move horizontally as well as vertically. The rate of material removal will depend on how fast the grinding wheel rotates, how quickly it moves relative to the grinding surface, and the position of the active surface of the grinding wheel in relation to the grinding surface. The desired grinding pattern to remove more material from a local hard zone than from an intermediate region can be achieved in a number of ways. For example, the grinding wheel could be controlled to obtain a movement up and down along on axis perpendicular to a raceway of the bearing ring while the bearing ring is being turned as it rests on a horizontal turning table. The grinding wheel position and position of bearing ring on the turning table are fully correlated via a control unit, to ensure a very precise grinding pattern. After obtaining the required circumferential profile for a specific diameter, the grinding wheel is shifted slightly inwards or outwards to a new position corresponding to a different diameter. The grinding process in the circumferential direction is then repeated.

This grinding process continues until the complete raceway has been ground to give the desired profile.

A control unit of such a grinding assembly is preferably realised to convert information relating to the grinding profile into appropriate control commands, for example to actuate motors of a turning table and/or the grinding wheel. Control of the grinding assembly components to adjust the grinding wheel position, speed etc. can be done by a suitable computer program that is directly loadable into a memory of a control unit or control module of a grinding assembly and that comprises suitable program elements for performing steps of the inventive method when the computer program is executed by the control unit of the grinding assembly. It is sufficient for a technician or user to identify the so-called "top mark" on the bearing surface (a mark placed by the bearing manufacturer to identify the uppermost point on the bearing when installed) to position the bearing ring in a defined orientation in the grinding assembly, and to input any relevant data to the computer program. The top mark may define "12 o'clock" for a rotor in the "bunny position". In this case, a top mark is exactly at "12 o'clock" on the outer ring, and is visible on the upwind and downwind sides of the bearing. Similar top marks are generally also present on the upwind and downwind sides of the inner ring, since the inner ring is generally mounted to the main shaft of the wind turbine with its top marks exactly at the "12 o'clock" position.

Alternatively or in addition, the bearing ring itself can be subject to a slight degree of intentional and reversible distortion before grinding, so that the distortion results in the desired grinding pattern. To this end, a suitable distortion means is incorporated in the grinding assembly. In one embodiment, the distortion means comprises a number of shims arranged under the bearing ring at suitable positions. For example, shims behind or under each blade region can effectively "push" the blade region closer to the grinding wheel, resulting in a deeper grinding depth over the blade region. Instead of shims, the turning table can be manufactured with a profiled mounting surface to achieve the desired distortion when the bearing ring is secured to the mounting surface. The bearing ring can be fixed to the turning table in any suitable manner, for example by using magnet arrangement incorporated in the grinding assembly, or by using an arrangement of clamps, bolts, etc. After grinding, any such distortion means are removed or dismounted, so that the bearing ring once again assumes its un-distorted shape, revealing the desired grinding pattern.

BRIEF DESCRIPTION

Some of the embodiments will be described in detail, with reference to the following figures, wherein like designations denote like members, wherein:

FIG. 11 shows a comparison of roller loads for a wind turbine main bearing.

In the diagrams, like numbers refer to like objects throughout. Objects in the diagrams are not necessarily drawn to scale.

DETAILED DESCRIPTION

Figure 1:
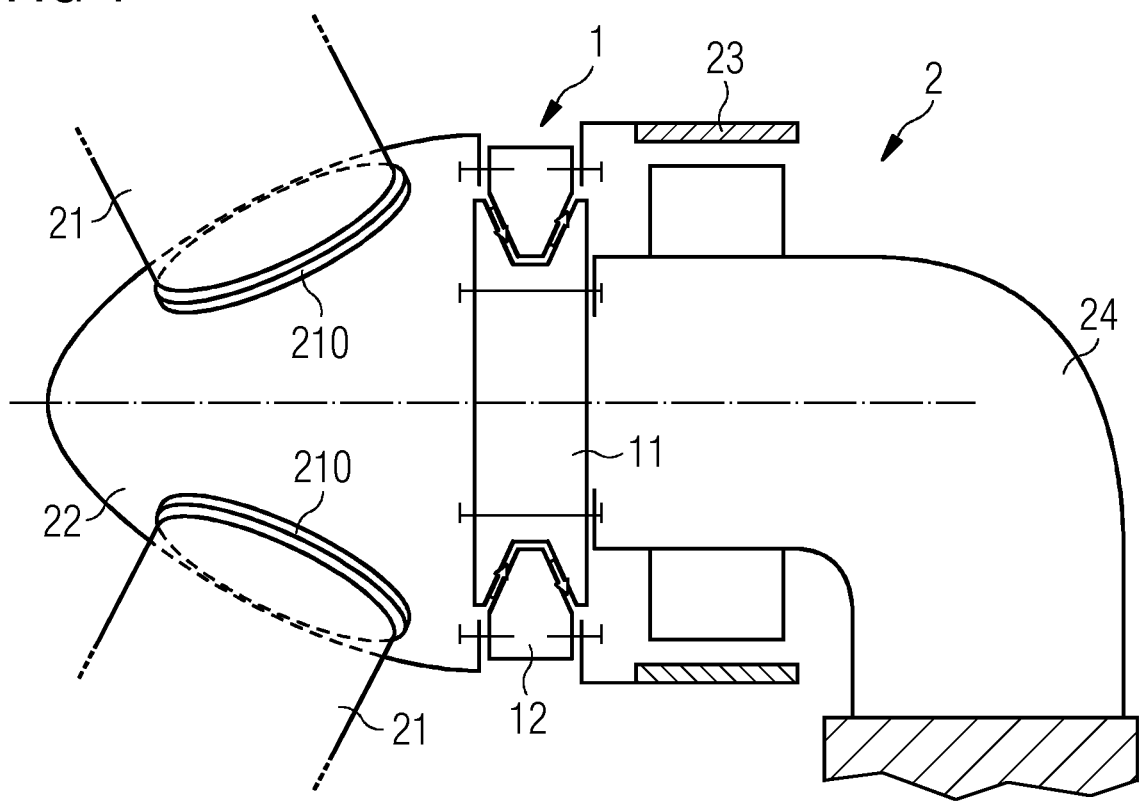
FIG. 1 shows the rotor of a wind turbine.

FIG. 1 shows the rotor of a wind turbine 2. The rotor comprises three blades 21 mounted to a hub 22. A circular opening at the downwind end of the hub is secured to the outer rotatable ring 12 of a main bearing 1. For a large multi-megawatt wind turbine, the length of a rotor blade 21 can exceed 45 m and the diameter of the main bearing 1 can be in the region of 2-5 m or even more. Such a bearing is generally realised as a two-row or three-row roller bearing. The skilled person will know that the rollers can be tapered, cylindrical or spherical cylindrical rollers. In this exemplary embodiment, the outer ring 12 of the main bearing 1 is mounted to a rotatable field 23 of the generator, and the inner ring 11 of the bearing 1 is mounted to a stub 24 or supporting shaft 24.

Figure 2:
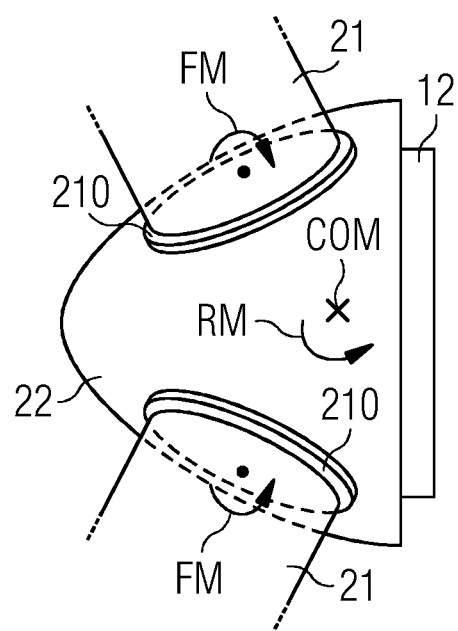
FIG. 2 shows bending moments relevant to the rotor and bearing of a wind turbine.

Owing to the large dimensions involved, the bearing even when manufactured using high-strength materials and with large thickness etc. can still be subject to great roller loading (measured in kN) and surface pressure (measured in MPa) on raceways during operation of the wind turbine. Uneven and sub-optimal loading manifest as local hard zones in the bearing on account of the conventional uniform machining approach. These local hard zones are the zones of the bearing in which the rollers and raceways are exposed to higher loads. Owing to the uneven load distribution, the bearing suffers from a more rapid accumulation of fatigue damage. Fatigue damage to the raceways or rollers can ultimately lead to seizure and failure of the bearing. The nature of the loading is illustrated in FIG. 2, which indicates the rotor 21, 22 and the outer bearing ring 12 of a three-blade wind turbine 2. The combined mass of the rotor has a centre of mass COM at a distance outward from the bearing in the upwind direction. The turning moment RM of the rotor 21, 22 therefore acts to tilt the bearing ring 12 (in an anti-clockwise direction when looking at this diagram). In addition, the wind force on a blade results in flapwise and edgewise bending moments. Flapwise bending moments FM are indicated in the drawing. Edgewise bending moments will be out of the plane of the page. These bending moments are transferred to the hub 22 through the rigid circular pitch bearings 210, and the resulting distortion of the hub 21 is passed on to the bearing ring 12.

Figure 3:
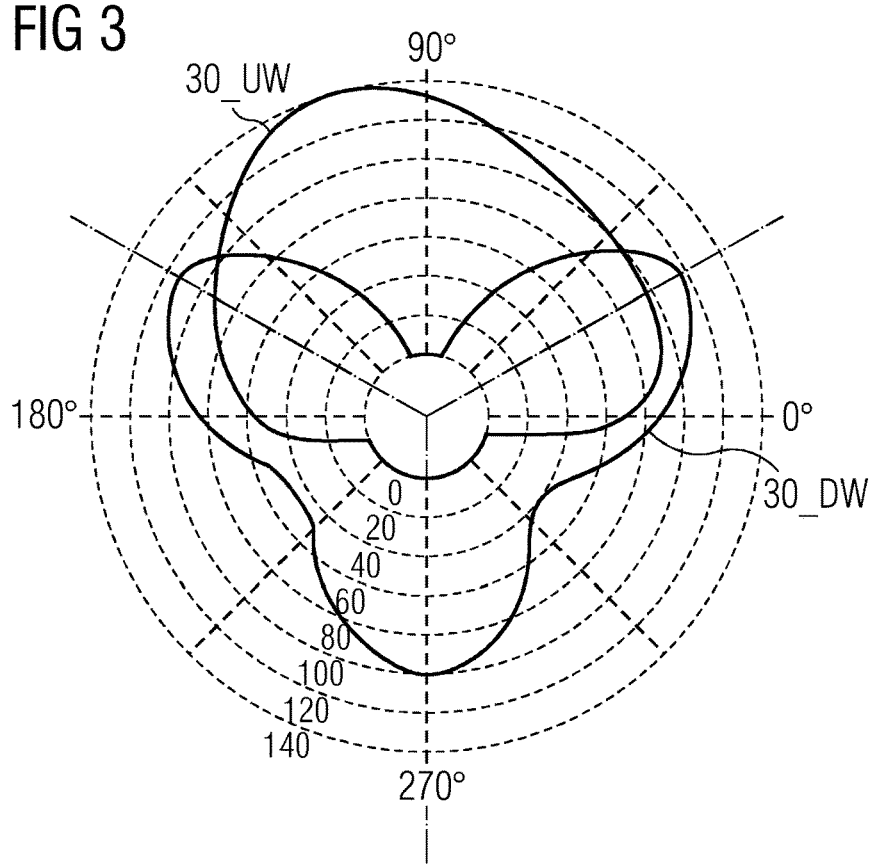
FIG. 3 shows a loading pattern of a bearing of a three-blade wind turbine according to prior art.

The loading effects of the fatigue characteristic load case is illustrated in FIG. 3, and indicates the roller forces acting on the rollers of a two-ring roller bearing when the blades are in the "bunny" or "Y" position, as indicated by the three long axes extending outward from the origin at 30°, 150° and 270°. The "12 o'clock" position of the bearing is at 90°. The roller forces are shown in a circular graph form, reflecting the positions of the rollers in the annular races. The roller force is indicated in kilonewtons (kN), with the inner ring representing 0 kN, and the outer ring representing 140 kN.

A first curve 30_UW shows the roller forces for the upwind race. When the blades of the rotor are in the "Y" position, the rollers close to the 12 o'clock position in the upwind race are subject to the highest loading. At any other position inside the bearing, the roller forces are lower. The loading on the rollers is highest for this "worst-case" rotor position.

A second curve 30_DW shows the roller forces for the downwind race. This curve shows that, when the blades are in the "Y" position, the rollers close to 30°, 150° and 270° are subject to significantly higher loading than neighbouring rollers in intermediate regions. The zones around these 30°, 150° and 270° positions are the so-called "local hard zones" for this bearing type. If the bearing is machined and finished in the conventional manner as described in the above, the higher loading in these hard zones will lead to accelerated fatigue damage. When the bearing is machined and finished using the inventive method, any such local hard zones are essentially eliminated and the roller forces in the bearing will be reduced (as shown in FIGS. 11 and 12 below), leading to a very favourable extension of the bearing's lifetime.

Figure 4:
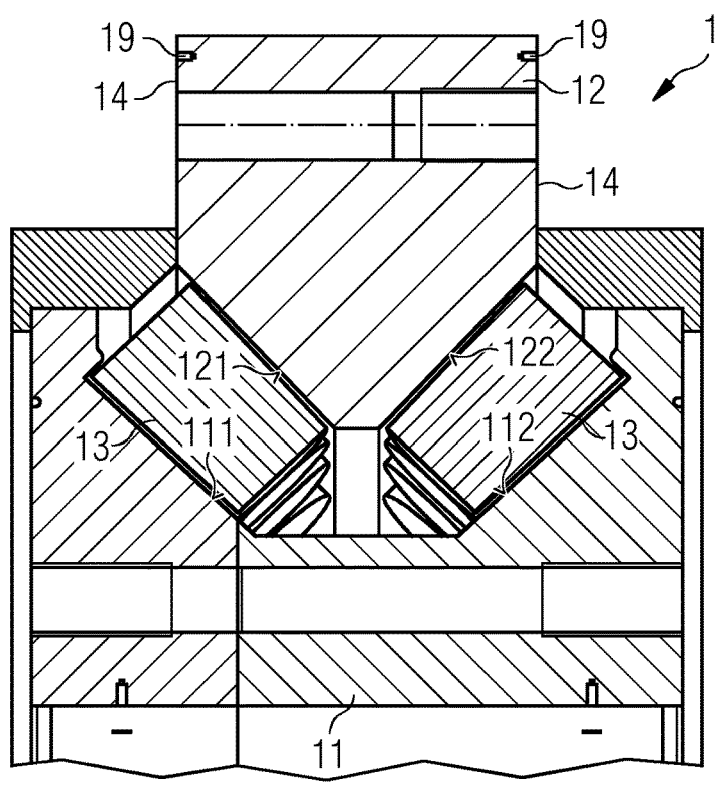
FIG. 4 shows a simplified partial cross-section through a bearing.

FIG. 4 shows a cross-section through the bearing 1, showing the outer ring 12, a two-part inner ring 11, and two sets of tapered rollers 13. The upwind race is defined by the outer ring upwind raceway 121 and the inner ring upwind raceway 111. The downwind race is defined by the outer ring downwind raceway 122 and the inner ring downwind raceway 112. The diagram also indicates top marks 19 provided by the bearing manufacturer to assist in correct installation of the bearing.

Figure 5:
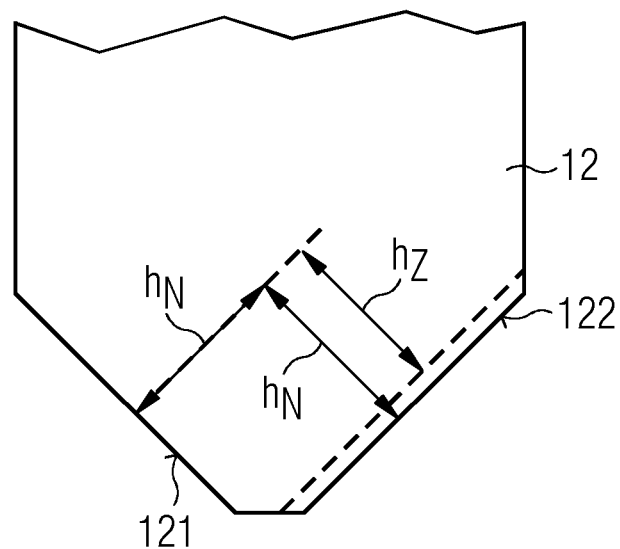
FIG. 5 shows results of grinding a bearing ring according to a first embodiment of the inventive method.

FIG. 5 shows results of a first embodiment of the inventive method when applied to grind the downwind raceway 122 of the outer ring 12 of the main bearing 1 of a direct-drive wind turbine. The diagram indicates in a greatly exaggerated manner the effect of increasing the grinding depth over a local hard zone (for example a blade region) to decrease the bearing ring thickness from a nominal thickness $h_N$ in an intermediate or non-blade region to a decreased thickness $h_Z$ in a blade region of the downwind raceway 122. This decrease in thickness can take into account any underlying profile of the raceway (for example a slightly curved profile of a crowned raceway) in order to maintain that underlying profile over the local hard zone.

Figure 6:
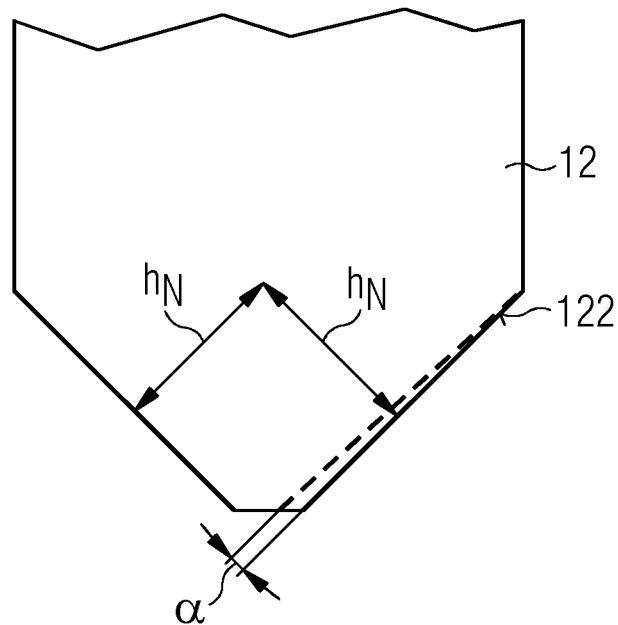
FIG. 6 shows results of grinding a bearing ring according to a second embodiment of the inventive method.

FIG. 6 shows results of a second embodiment of the inventive method when applied to grind the downwind raceway 122 of the outer ring 12 of the main bearing 1 of a direct-drive wind turbine. Here, the downwind raceway 122 of the outer ring 12 has been ground to achieve an angular correction in the blade regions, with the ring thickness being reduced in a linear and gradual manner from the outer circumference of the raceway to the inner circumference of the raceway. Here also, the grinding is performed to take into account any underlying profile of the raceway 122 in order to maintain that underlying profile over the local hard zone also.

While FIGS. 4-6 only show the effect of grinding one of these raceways, namely the outer ring downwind raceway 122, it shall be understood that any combination of these surfaces can be ground using the inventive method to achieve a desired grinding pattern.

Figure 7:
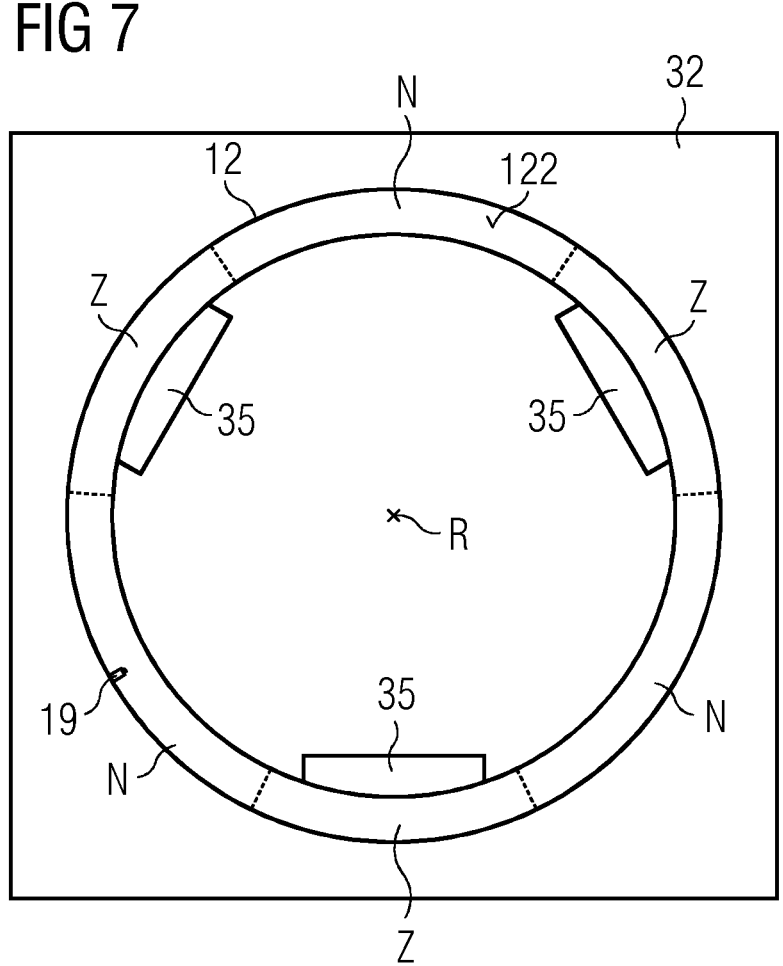
FIG. 7 shows a simplified plan view of an embodiment of the inventive grinding assembly.

FIG. 7 shows a simplified plan view of an embodiment of the inventive grinding assembly. The bearing ring to be processed—in this case the outer bearing ring 12 of a wind turbine main bearing—is shown resting on a flat support such as a turning table 32. The turning table 32 can rotate the bearing ring 12 about its axis of rotation R. Three blade regions Z have been previously identified for this bearing ring 12. These are indicated by the dotted lines in the diagram, and it will be understood that these virtual positions may be defined in a suitable coordinate system that can be understood by a control unit of the grinding assembly. The top mark 19 of the bearing can be used to define the position of the bearing in that coordinate system. Any relevant data can be provided to a control program of the control unit in the usual manner. In this diagram, the grinding assembly is shown in include a set of shims 35. Each shim 35 is placed under a local hard zone Z to effectively push that part of the bearing ring 12 upward towards a grinding wheel. It is possible to distort the bearing ring 12 in this way owing to the relatively low bending stiffness of this part on its own. The bearing ring 12 can be fixed to the turning table 32 by different methods e.g. magnetic equipment integrated in the grinding assembly, by using a suitable arrangement of bolts and brackets, etc.

Figure 8:
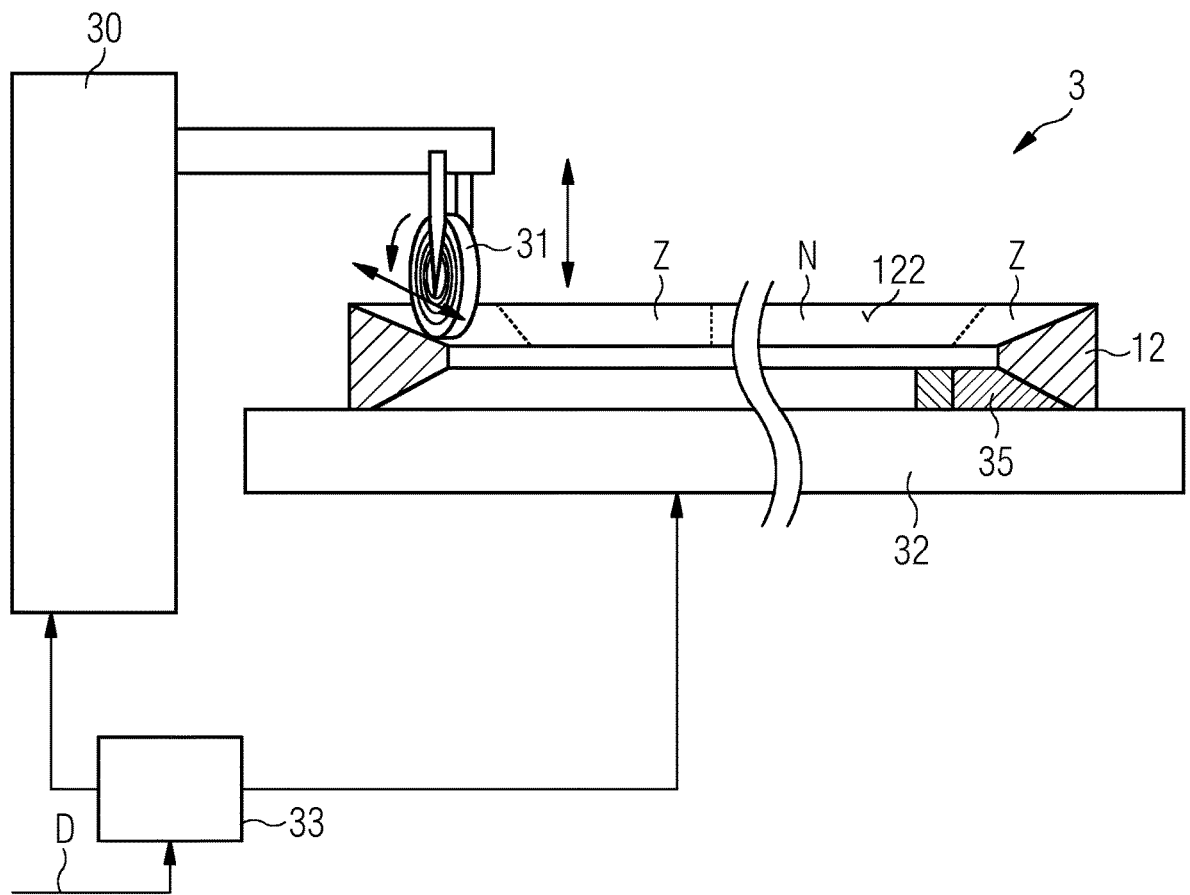
FIG. 8 shows a simplified frontal view of an embodiment of the inventive grinding assembly.

FIG. 8 shows a very simplified frontal or side view of an embodiment of the inventive grinding assembly. Here, a grinding machine 30 is shown to hold a grinding wheel 31 relative to the raceway of a bearing ring 12. The turning table 32 can be rotatable, and the control unit 33 can also control its rate and/or direction of rotation by appropriate commands sent to a motor of a turning unit (not shown) of the turning table 32. The diagram also indicates a number of local hard zones Z on the ring 12. For clarity, only a part of the bearing ring 12 is shown in cross-section. The bearing ring 12 is fixed on the turning table 32. Before starting the grinding process, any relevant data D regarding the grinding profile is fed to the computer program loaded into a memory of the control unit 33. The grinding wheel 31 can be raised and lowered during turning of the bearing ring 12, in a direction perpendicular to the raceway, in response to a signal from a control unit 33. The control unit 33 also issues commands to the grinding machine 30 to adjust the position of the grinding wheel 31 to a new diameter on the raceway. Appropriate control commands result in the desired grinding profile as described in FIG. 5, for example.

Figure 9:
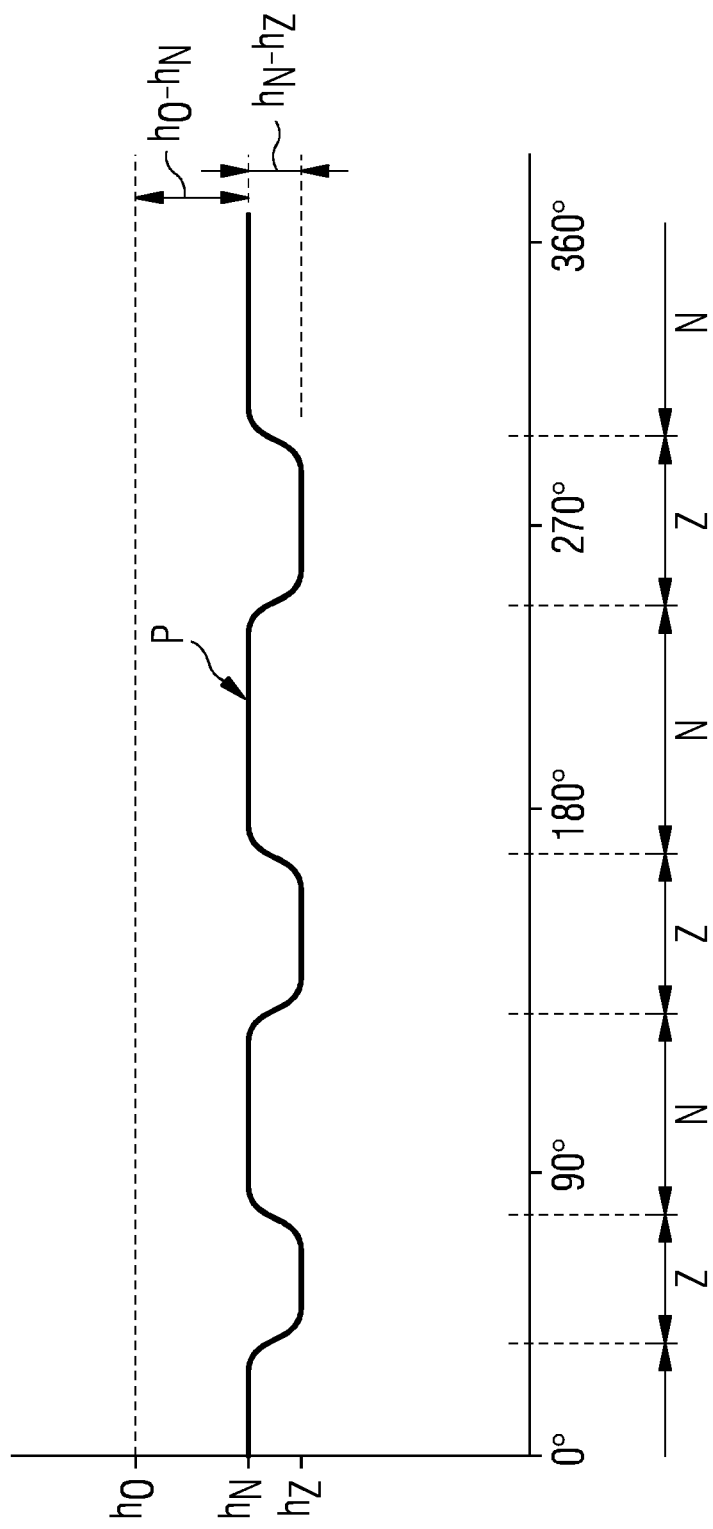
FIG. 9 illustrates a grinding pattern achieved using the inventive method.

FIG. 9 illustrates a greatly simplified grinding pattern P or machining depth profile P achieved using the inventive method. The diagram serves to illustrate the final grinding pattern, and shows the alternating "deeper" regions corresponding to local hard zones Z, and nominal or shallower regions that correspond to intermediate or non-blade regions N. The diagram is not drawn to scale: the circumference of the bearing ring (from 0° to 360°) can be in the region of 12 m, while the grinding depth from the initial level $h_0$ to the final depth $h_N$ in a non-blade region N may be less than two tenths of a millimetre (i.e. less than 200 μm), and the additional grinding depth from the level $h_N$ of a non-blade region N to the depth $h_Z$ in a local hard zone Z may be only a few tens of microns, for example 60 μm or even less. The starting bearing ring thickness is indicated by the line running through $h_0$. During the final grinding stage, material is removed from the bearing ring raceway to achieve a thickness $h_N$ in a non-blade region N and a thickness $h_Z$ in a local hard zone Z. The grinding depth "y" mentioned in the description is given by the difference $h_0 - h_N$; the grinding depth "x" is given by the difference $h_0 - h_Z$. Because of the different scales used for the X and Y axes, the diagram appears to show pronounced steps between the level $h_N$ of a non-blade region N and the level $h_Z$ in a local hard zone Z, but it will be understood that this transition over only a few microns is in fact very smooth.

Figure 10:
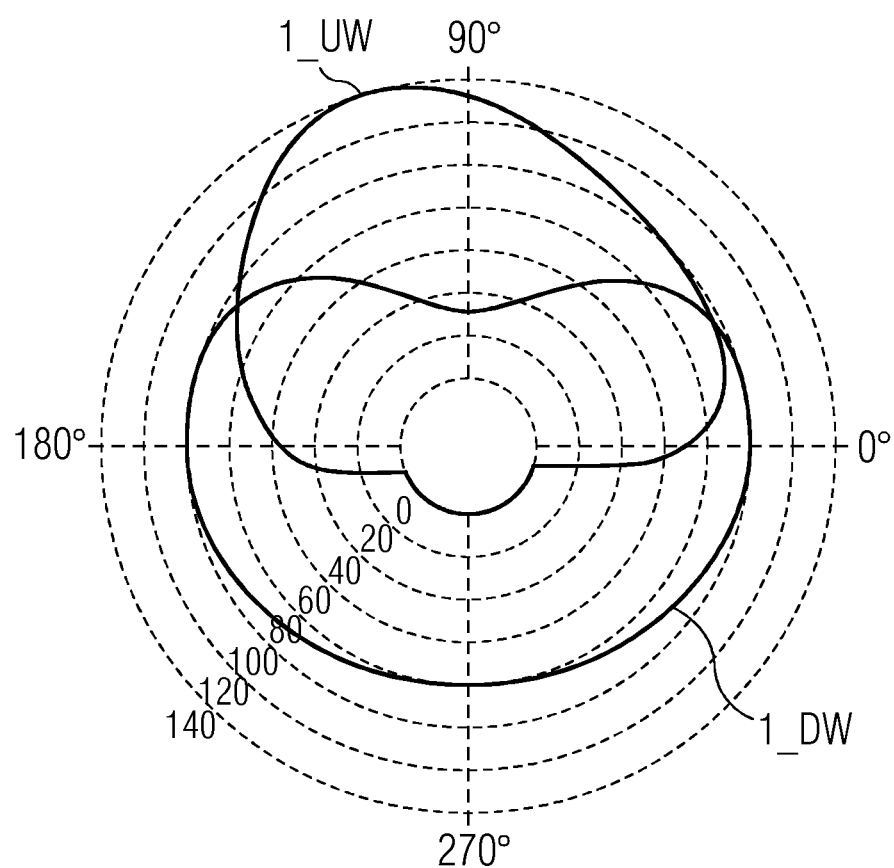
FIG. 10 shows a loading pattern of a bearing that was finished using the inventive method.

FIG. 10 shows the roller forces in a two-race bearing of a three-blade wind turbine, for which the bearing has been finished using the inventive grinding method. Similarly to FIG. 3, the diagram indicates a "Y" position of the rotor. Here, a first curve 1_UW shows the roller forces for the upwind race. This is similar to the roller forces 30_UW for the upwind race of FIG. 3 above, and the rollers close to 12 o'clock (90°) in the upwind race are subject to the highest loading. However, the roller forces 1_DW in the downwind race are significantly lower compared to the roller forces 30_DW in the downwind race of the conventional bearing described in FIG. 3 above. The significantly reduced roller forces in the downwind race will lead to significant reduction in fatigue damage, leading to a favourable extension of the lifetime of the bearing compared to one that is manufactured according to the prior art methods.

To illustrate the beneficial effect that can be achieved by the inventive grinding method, FIG. 11 shows a comparison of roller loads (in kN) against angular position (in degrees) for the outer ring of a wind turbine main bearing. The diagram indicates that the upwind race roller loading 30_UW, 1_UW (as shown in FIG. 3 and FIG. 10 above) in is essentially the same for the conventional bearing and the inventive bearing. Significant improvements are seen when the downwind race roller loading 30_DW, 1_DW are compared: The diagram shows a downwind roller load profile 30_DW (as shown in FIG. 3) for a bearing finished using a prior art method, and a downwind roller load profile 1_DW (as shown in FIG. 10) for a bearing finished using the inventive grinding method. The critical hard zones Z associated with uneven roller loading in the conventionally ground bearing are also indicated in the diagram, and a local hard zone Z can extend over about 30°-40°. In these local hard zones Z, the maximum roller forces are significantly higher than the roller forces in the intermediate regions. Using the inventive method, the roller forces will be much more evenly distributed over the circumference of the bearing (rollers at the intermediate regions will now carry more load) and the maximum roller forces will be strongly reduced, indicated by the much smaller local hard zones Z' extending over only a few degrees at most. These smaller local hard zones Z' may be so small as to be negligible. This reduction in roller loading leads to bearing lifetime improvements in the range of 10%-30%.

Although the present invention has been disclosed in the form of preferred embodiments and variations thereon, it will be understood that numerous additional modifications and variations could be made thereto without departing from the scope of the invention. For example, a grinding surface may be an outer vertical surface on a flange of a bearing ring. The bearing is installed by fasteners such as bolts that are inserted through bushings or bores in the flange and then tightened. Usually, a flange surface that faces in the upwind or downwind direction is generally machined to be as flat or planar as possible. However, such a flange surface (for example a flange surface of the outer ring of a main bearing for a direct-drive wind turbine) could also be subject to machining using the inventive method to achieve a non-uniform flange surface that can assist the bearing in obtaining an improved load pattern for the rollers inside the bearing, and this is beneficial for the bearing lifetime.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method of machining a bearing ring of a wind turbine bearing, wherein the bearing ring is an outer ring of the wind turbine bearing, the method comprising:
   identifying a local hard zone on a surface of the bearing ring; and
   removing material from the surface such that a bearing ring thickness in the local hard zone is less than a bearing ring thickness outside the local hard zone.

2. The method according to claim 1, wherein the surface is a raceway of the bearing ring.

3. The method according to claim 1, further comprising removing material from a flange face of the bearing ring.

4. The method according to claim 1, wherein a position of the local hard zone relates to a position of a rotor blade relative to the bearing ring.

5. The method according to claim 1, further comprising determining a machining depth profile over the surface.

6. The method according to claim 1, wherein the bearing ring thicknesses and/or a machining depth profile are determined on a basis of wind turbine rotor loading values.

7. The method according to claim 1, wherein the wind turbine bearing is a tapered bearing and wherein, in the local hard zone, material is removed from the surface to achieve an angular correction of the surface in the local hard zone such that an outer circumferential bearing ring thickness of an outer bearing ring of the tapered bearing is greater than an inner circumferential bearing ring thickness of the outer bearing ring of the tapered bearing.

8. The method according to claim 1, wherein the wind turbine bearing has at least two rows of rollers.

9. The method according to claim 1, wherein the wind turbine bearing is a tapered bearing.

10. The method according to claim 1, wherein the surface is on a downwind raceway of the wind turbine bearing.

11. The method according to claim 1, wherein the wind turbine bearing is a tapered bearing having at least two rows of rollers and the surface is on a downwind raceway of the outer ring.

12. A machining assembly comprising:
   a support configured to hold a bearing ring of a wind turbine during a machining procedure, wherein the bearing ring is an outer ring of the wind turbine bearing;
   a machining tool arranged to remove material from a machining surface of the bearing ring; and
   a control unit configured to (1) identify a local hard zone on a surface of the bearing ring and (2) remove material from the surface such that a bearing ring thickness in the local hard zone is less than a bearing ring thickness outside the local hard zone.

13. The machining assembly according to claim 12, wherein the control unit is further configured to achieve a relative motion between the machining tool and the bearing ring.

14. The machining assembly according to claim 12, wherein the support is rotatable, and the control unit is further configured to control a rotation of the support.

15. The machining assembly according to any of claim 12, wherein the support comprises a support table arranged to carry the bearing ring in a horizontal position.

16. The machining assembly according to claim 12, further comprising a shim arranged under the bearing ring at a position corresponding to the local hard zone.

17. A computer program product A computer program product, comprising a computer readable hardware storage device having computer readable program code stored therein, said program code executable by a processor of a computer system to implement a method according to claim 1 when the computer program is executed by the control unit of the machining assembly.

* * * * *